United States Patent
Rivero et al.

(10) Patent No.: US 11,428,124 B2
(45) Date of Patent: Aug. 30, 2022

(54) FLANGE STRESS-REDUCTION FEATURES

(71) Applicant: Raytheon Technologies Corporation, Farmington, CT (US)

(72) Inventors: Pedro Rivero, Palm Beach Gardens, FL (US); Brian Craig, Palm Beach Gardens, FL (US); Aaron T. Goldman, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/197,580

(22) Filed: Nov. 21, 2018

(65) Prior Publication Data

US 2020/0157972 A1    May 21, 2020

(51) Int. Cl.
*F23R 3/60*    (2006.01)
*F01D 25/24*    (2006.01)
*F01D 9/02*    (2006.01)

(52) U.S. Cl.
CPC ............ *F01D 25/243* (2013.01); *F01D 9/023* (2013.01); *F05D 2220/32* (2013.01); *F23R 3/60* (2013.01)

(58) Field of Classification Search
CPC ...... F01D 25/243; F01D 25/265; F01D 25/26; F01D 25/28; F02C 7/20; F05D 2260/941
See application file for complete search history.

(56) References Cited

U.S. PATENT DOCUMENTS

| | | | | |
|---|---|---|---|---|
| 5,437,482 A * | 8/1995 | Curtis | ................... | F16L 23/028 285/148.13 |
| 6,123,170 A * | 9/2000 | Porte | ..................... | B64D 33/02 181/198 |
| 6,227,798 B1 | 5/2001 | Demers | | |
| 6,499,957 B1 | 12/2002 | Klingels et al. | | |
| 8,353,670 B2 * | 1/2013 | Glasspoole | ............. | F01D 5/027 416/144 |
| 9,255,395 B2 * | 2/2016 | Kosuri | ..................... | F03D 13/20 |
| 10,655,501 B2 * | 5/2020 | Lepretre | ............... | F01D 25/246 |
| 2003/0099542 A1 * | 5/2003 | Czachor | ............... | F01D 11/005 415/189 |
| 2004/0223846 A1 | 11/2004 | Taylor | | |
| 2011/0236203 A1 * | 9/2011 | Arilla | ..................... | F01D 11/005 415/213.1 |
| 2013/0032669 A1 * | 2/2013 | Porte | ..................... | F01D 25/243 244/131 |
| 2015/0176430 A1 * | 6/2015 | Szarvasy | ................. | F01D 25/12 60/796 |
| 2015/0308097 A1 | 10/2015 | Kosuri | | |
| 2016/0281541 A1 | 9/2016 | Monteiro | | |
| 2016/0363004 A1 * | 12/2016 | Chow | ..................... | F01D 25/24 |

(Continued)

OTHER PUBLICATIONS

EP search report for EP19210777.9 dated Mar. 31, 2020.
EP office action for EP19210777.9 dated Jun. 10, 2021.

*Primary Examiner* — Gerald L Sung

(74) *Attorney, Agent, or Firm* — Getz Balich LLC

(57) ABSTRACT

A flange includes a flange body annularly disposed about a longitudinal axis. The flange body includes a first radial side and a second radial side radially opposite the first radial side. The flange body defines a first fastener hole and a circumferentially adjacent second fastener hole formed through the flange body. A first shielding zone has at least a portion of the first shielding zone located between the first and second fastener holes. A first shielding feature is disposed in the first shielding zone.

9 Claims, 12 Drawing Sheets

(56) References Cited

U.S. PATENT DOCUMENTS

| | | |
|---|---|---|
| 2018/0223691 A1 | 8/2018 | Dale |
| 2018/0291766 A1* | 10/2018 | Uetsuki ............... F01D 25/24 |
| 2020/0141280 A1* | 5/2020 | Kusakabe ............ F01D 25/16 |

* cited by examiner

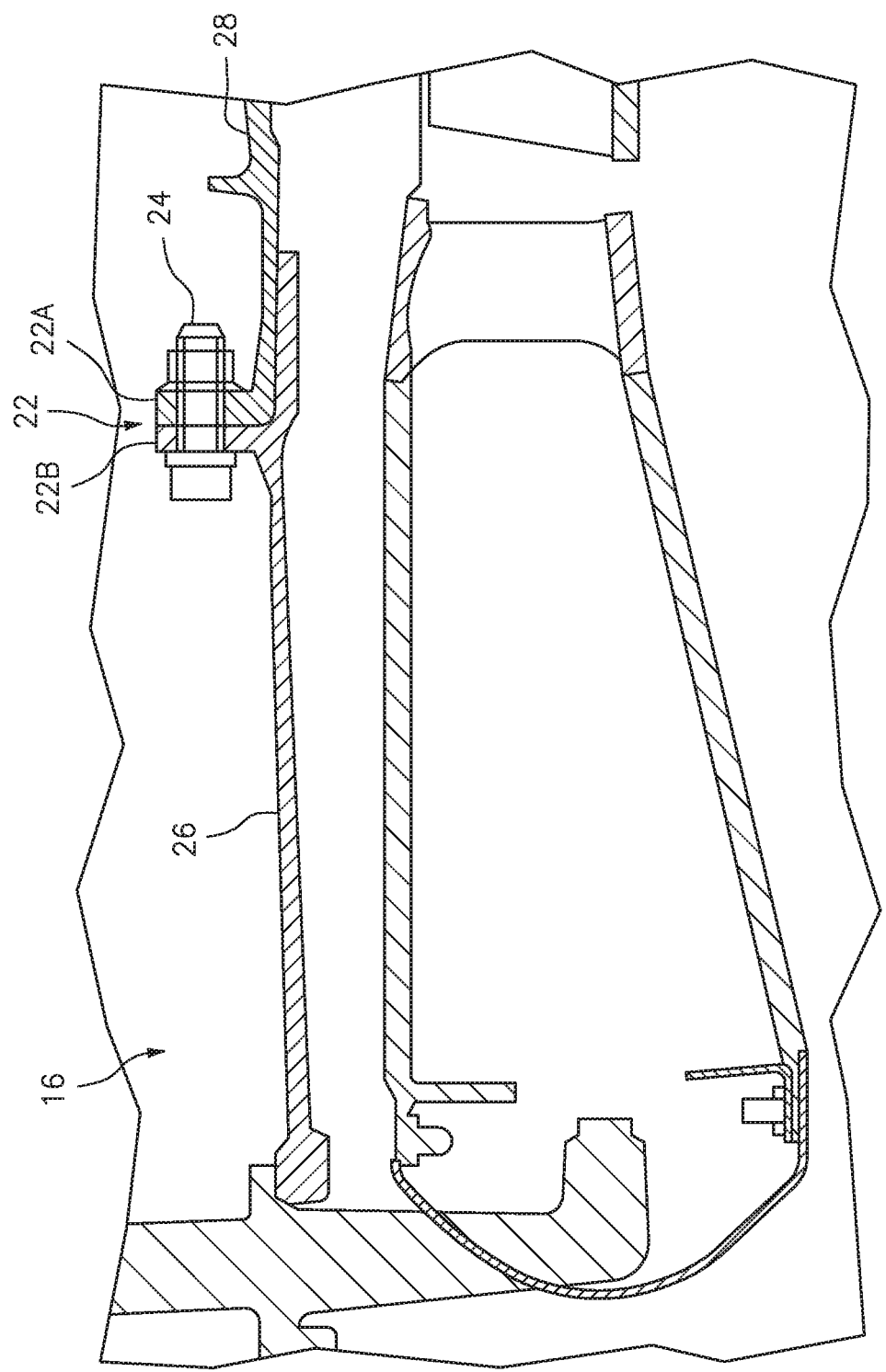

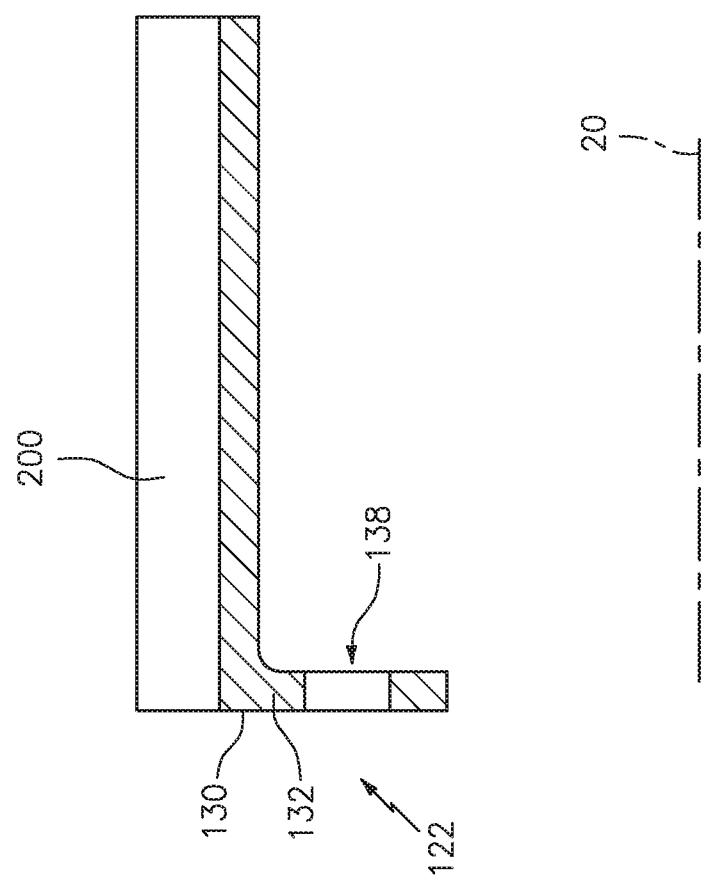

FLANGE STRESS-REDUCTION FEATURES

BACKGROUND

1. Technical Field

This disclosure relates generally to aircraft gas turbine engine flanges, and more particularly to flange stress-reduction features.

2. Background Information

Flanges for gas turbine engines can be used to attach cases of various engine components, for example, an outer diffuser case and high-pressure turbine case. These flanges are often subject to external loads, large pressure variations, and thermal gradients, which may cause high levels of stress (e.g., hoop stress) in portions of the flange resulting in reduction of operational life. As a result, meeting product life requirements for these flanges may present a significant challenge.

Gas turbine engine space and weight considerations may make increasing the thickness of flanges, to address stresses, impractical. Additionally, flange design features intended to reduce flange stresses may adversely affect flange sealing capabilities (e.g., flange face and snap face tightness) during gas turbine engine operations. Accordingly, a flange addressing one or more of the above concerns would find utility.

SUMMARY

According to an aspect of the present disclosure, a flange includes a flange body annularly disposed about a longitudinal axis. The flange body includes a first radial side and a second radial side radially opposite the first radial side. The flange body defines a first fastener hole and a circumferentially adjacent second fastener hole formed through the flange body. A first shielding zone has at least a portion of the first shielding zone located between the first and second fastener holes. A first shielding feature is disposed in the first shielding zone.

In the alternative or additionally thereto, in the foregoing aspect, the flange body includes a first radial portion and a radially adjacent second radial portion. The first shielding zone is disposed within the first radial portion.

In the alternative or additionally thereto, in the foregoing aspect, the flange includes a first radial centerline and a second radial centerline. The first and second radial centerlines bisect the respective first and second fastener holes. The first shielding zone is bounded by the first radial side, the first and second radial centerlines, and the first and second fastener holes.

In the alternative or additionally thereto, in the foregoing aspect, the flange body includes a scallop disposed in the second radial portion radially adjacent the first shielding zone.

In the alternative or additionally thereto, in the foregoing aspect, the first shielding feature is a recess extending partially through the flange body in a substantially axial direction.

In the alternative or additionally thereto, in the foregoing aspect, the first shielding feature is a thru-hole extending through the flange body.

In the alternative or additionally thereto, in the foregoing aspect, the flange includes a second shielding zone. At least a portion of the second shielding zone is located between another of the first fastener hole and the second fastener hole.

In the alternative or additionally thereto, in the foregoing aspect, the flange includes a second shielding feature, different than the first shielding feature, and disposed in the second shielding zone.

In the alternative or additionally thereto, in the foregoing aspect, the first shielding feature includes a plurality of shielding features.

In the alternative or additionally thereto, in the foregoing aspect, the plurality of shielding features includes at least one shielding feature and at least one other shielding feature, different than the at least one shielding feature.

In the alternative or additionally thereto, in the foregoing aspect, the first shielding feature is configured to reduce a stress of the flange body proximate one of an inner diameter and an outer diameter of each of the first and second fastener holes.

In the alternative or additionally thereto, in the foregoing aspect, the stress is induced by at least one of a pressure differential and a thermal gradient across the flange body.

In the alternative or additionally thereto, in the foregoing aspect, the thermal gradient extends radially from an inner radial side of the flange body to an outer radial side of the flange body.

According to another aspect of the present disclosure, a case includes a flange. The flange includes a flange body annularly disposed about a longitudinal axis. The flange body includes a first radial portion and a radially adjacent second radial portion. The flange body defines a plurality of fastener holes formed through the flange body. Each shielding zone of a plurality of shielding zones is disposed within the first radial portion and, at least in part, between each pair of adjacent fastener holes of the plurality of fastener holes. At least one shielding feature is disposed in at least one shielding zone of the plurality of shielding zones.

In the alternative or additionally thereto, in the foregoing aspect, the plurality of shielding zones includes a first shielding zone and a second shielding zone. The at least one shielding feature of the first shielding zone is different than the at least one shielding feature of the second shielding zone.

In the alternative or additionally thereto, in the foregoing aspect, at least one shielding zone of the plurality of shielding zones includes at least two shielding features.

In the alternative or additionally thereto, in the foregoing aspect, the at least two shielding features includes a first shielding feature and a second shielding feature, different than the first shielding feature.

According to another aspect of the present disclosure, a gas turbine engine includes a case and a flange in communication with the case. The flange includes a flange body annularly disposed about a longitudinal centerline of the gas turbine engine. The flange body includes a first radial side and a second radial side radially opposite the first radial side. The flange body defines a first fastener hole and a circumferentially adjacent second fastener hole formed through the flange body. A first shielding zone has at least a portion of the first shielding zone located between the first and second fastener holes. A first shielding feature is disposed in the first shielding zone.

In the alternative or additionally thereto, in the foregoing aspect, the flange body includes a first radial portion and a radially adjacent second radial portion. The first shielding zone is disposed within the first radial portion.

In the alternative or additionally thereto, in the foregoing aspect, the flange is within at least one of a combustor section or a turbine section of the gas turbine engine.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 2 is a cross-section of a combustor section of the gas turbine engine of FIG. 1.

FIG. 6A is a side view of an inner flange.

DETAILED DESCRIPTION

Figure 1:
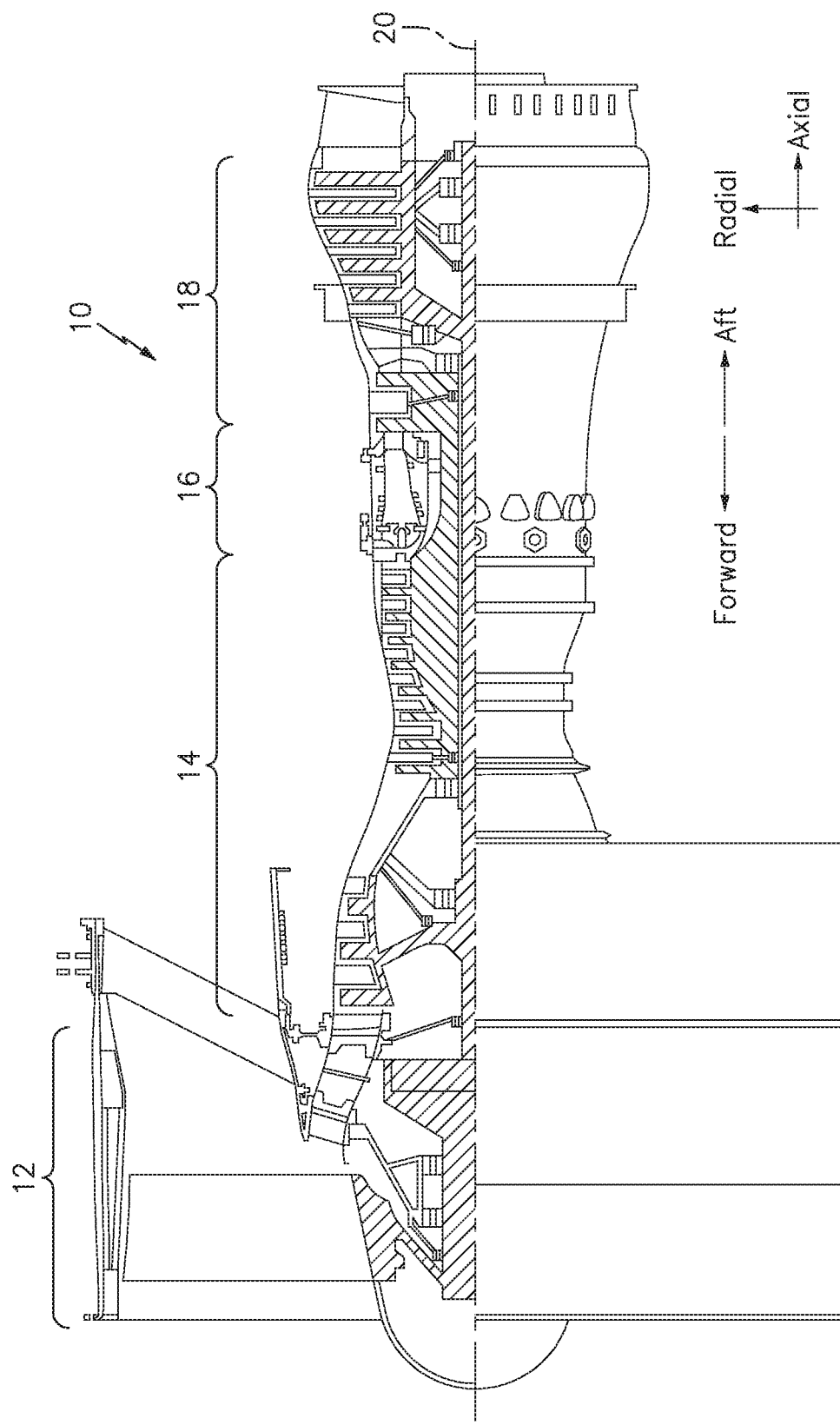
FIG. 1 is a schematic cross-section of a gas turbine engine.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

FIG. 1 schematically illustrates a gas turbine engine 10. The gas turbine engine 10 generally includes a fan section 12, a compressor section 14, a combustor section 16, and a turbine section 18 disposed about a longitudinal axis 20 (e.g., a longitudinal centerline of the gas turbine engine 10). The fan section 12 drives air along a bypass flowpath while the compressor section 14 drives air along a core flowpath for compression and communication into the combustor section 16. The compressed air is heated by the combustor section 16 to generate a high-pressure exhaust gas stream that expands through the turbine section 18. The turbine section 18 extracts energy from the high-pressure exhaust gas stream to drive the fan section 12 and the compressor section 14. Although depicted as a turbofan in the disclosed non-limiting embodiment, it should be understood that the concepts described herein are not limited to use with turbofans as the teachings may be applied to other types of turbine engines.

Figure 2A:
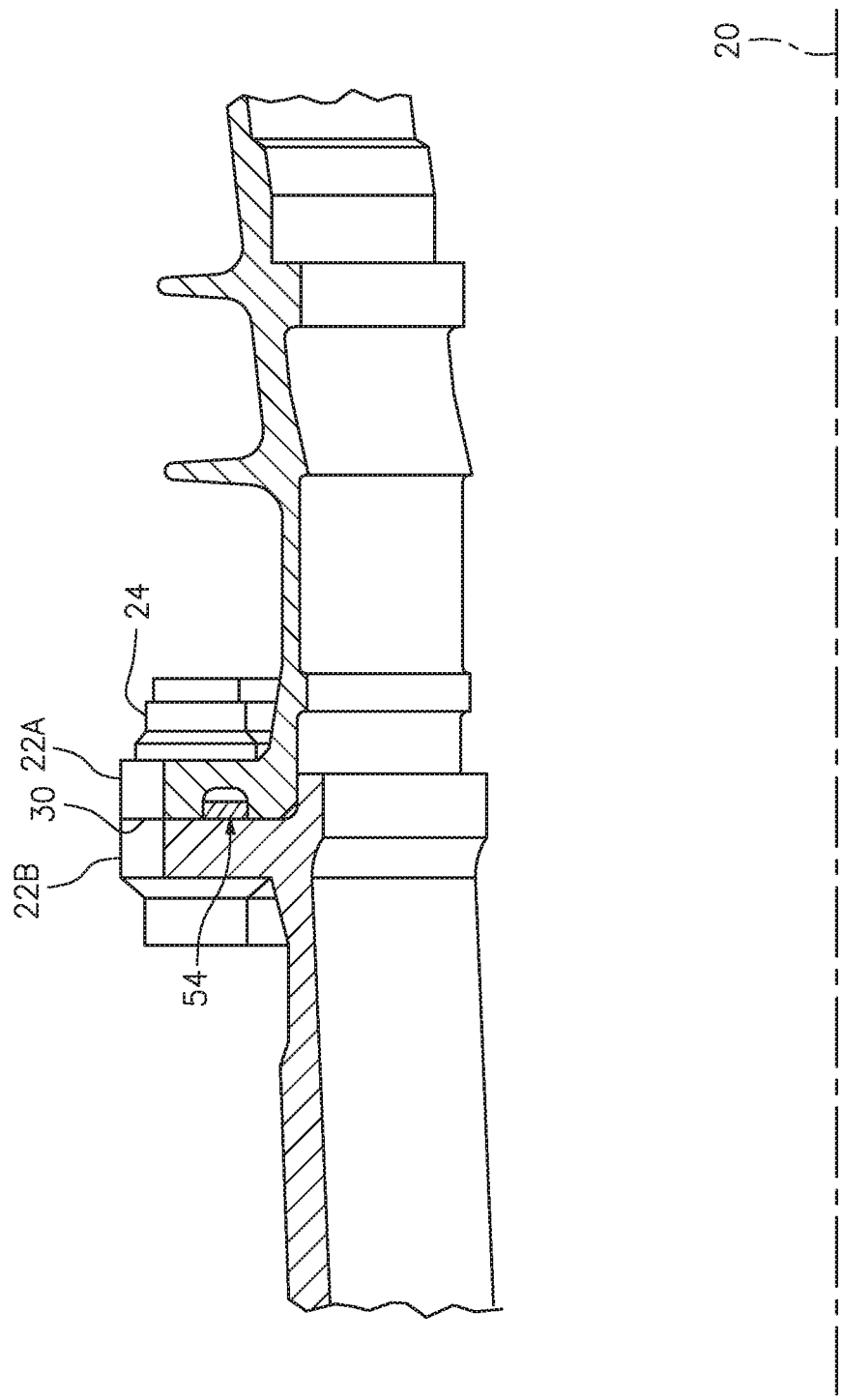
FIG. 2A is an illustration of the flange of FIG. 2.

Referring to FIGS. 1, 2, and 2A, components of the gas turbine engine 10, including but not limited to the fan section 12, the compressor section 14, the combustor section 16, the turbine section 18, or parts of the preceding components can be assembled together with bolted flanges. In certain embodiments, component cases can include flanges to allow connection and assembly thereof. For example, in the illustrated embodiment, the flange 22 is an outer flange (i.e., extending radially outward from the case) used to assemble an outer diffuser case 26 with the high-pressure turbine case 28.

The flange 22 may be used to provide mating surfaces (e.g., flange face 30; see also FIG. 3), for example, to connect a component case to another component. In the illustrated embodiment, the flange 22 includes a first flange 22A and a second flange 22B. Flange fasteners 24 (e.g., bolts) may be used to connect the first flange 22A and the second flange 22B. During operation of the gas turbine engine 10, heat may be transferred from gas turbine engine 10 components (e.g., a combustor or high-pressure turbine) and component case to the flange 22 creating a thermal gradient across the flange 22. In certain applications, the thermal gradient can create thermal stress in certain portions of the flange 22. As will be discussed in further detail, flanges, such as flanges 22A, 22B, may include a shielding feature 54.

Figure 3:
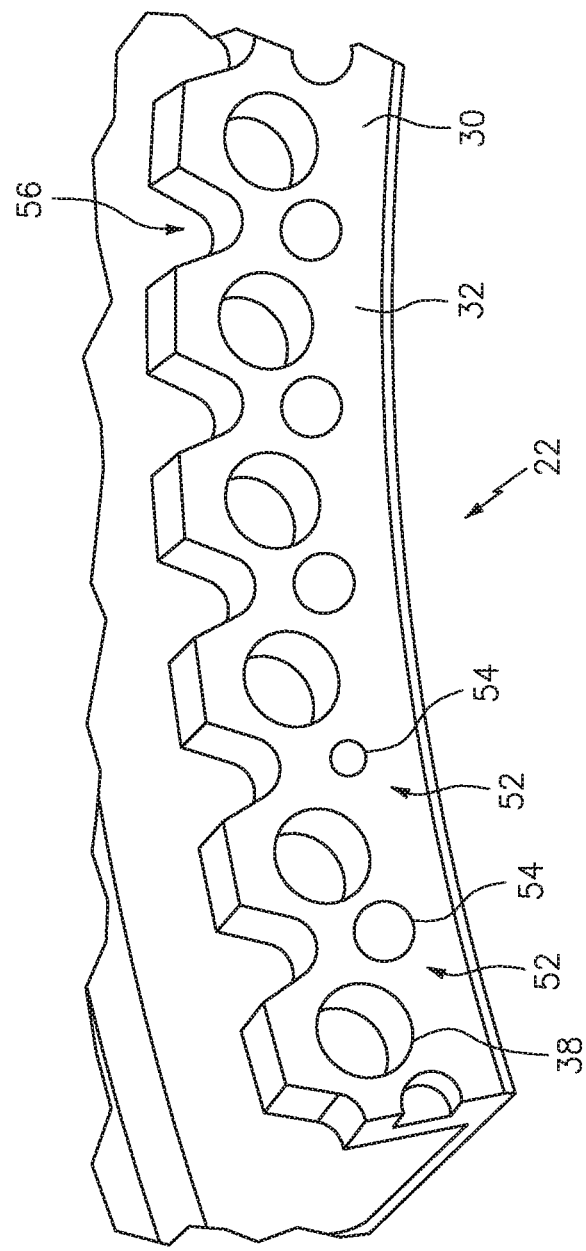
FIG. 3 is a perspective view of a portion of an exemplary outer flange.
Figure 4:
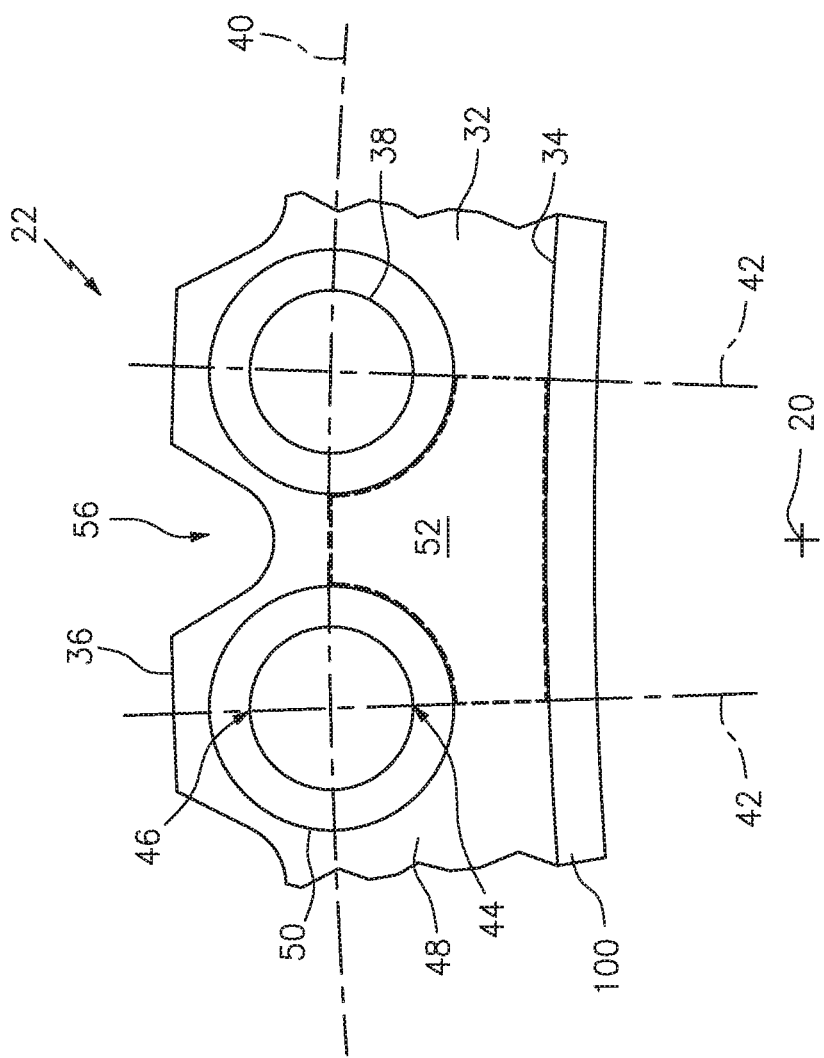
FIG. 4 is a front view of an outer flange.

Referring to FIGS. 3 and 4, a portion of flange 22 is shown. The flange 22 generally includes a flange body 32 annularly disposed about the longitudinal axis 20 and having an inner radial side 34 and an outer radial side 36. A plurality of fastener holes 38 are formed through the flange body 32 (e.g., in an axial direction with respect to the longitudinal axis 20). A circumferential centerline 40 bisects each fastener hole 38. The flange body 32 includes an inner radial portion 48, defining an inner radial volume of the flange body 32 (i.e., a portion of the flange body 32 adjacent the case 100), and an outer radial portion 50, defining an outer radial volume of the flange body 32. In some embodiments, the circumferential centerline 40 may define the boundary between the inner radial portion 48 and the outer radial portion 50 of the flange body 32. Each fastener hole 38 includes a radial centerline 42 bisecting the respective fastener hole in a radial direction. Each fastener hole 38 further includes an inner diameter 44 (i.e., the radially innermost portion of the fastener hole 38) and an outer diameter 46 (i.e., the radially outermost portion of the fastener hole 38).

The flange body 32 can have any suitable thickness and be formed from any suitable material. In the illustrated embodiment, the flange body 32 is generally circular or hoop shaped. The plurality of fastener holes 38 and associated flange fasteners 24 may be used to provide a suitable coupling force needed for operation and assembly between associated flanges/cases (e.g., flanges 22A, 22B of FIG. 2). The fastener holes 38 may be disposed in a circumferential arrangement around the flange body 32. In the illustrated embodiment, the flange 22 may be associated with, affixed to, or otherwise coupled to a case 100 (e.g., cases 26, 28 of FIG. 2). In certain embodiments, the flange 22 may be integrally formed with the case 100. The case 100 can be any suitable component case, including but not limited to, the outer diffuser case 26, the high-pressure turbine case 28, etc. In some embodiments, the flange 22 may function as, for example, a bearing compartment flange or any other flange in a gas turbine engine 10.

Figure 6B:
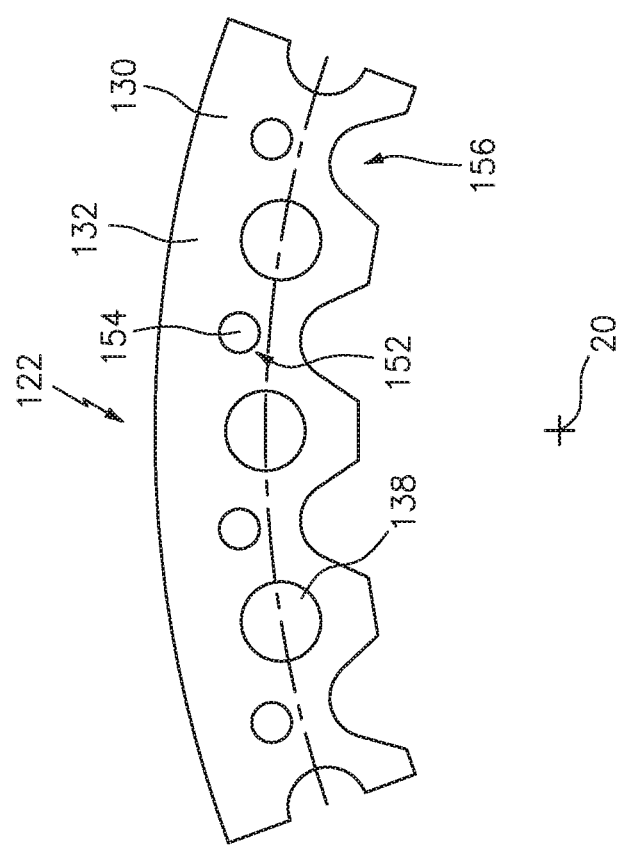
FIG. 6B is a front view of a portion of the inner flange of FIG. 6A.
Figure 6C:
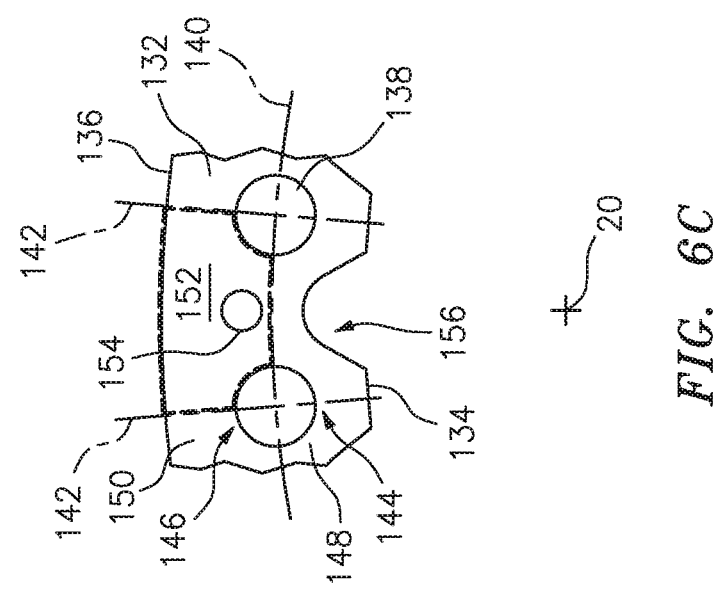
FIG. 6C is another front view of a portion of the inner flange of FIG. 6A.

Referring to FIGS. 6A-C, a flange 122 configured as an inner flange (i.e., extending radially inward from the case) is shown. The features of flange 122 are substantially similar to those of flange 22. The flange 122 includes a flange face 130 configured to provide a mating surface, for example, to connect a component case to another component. The flange 122 generally includes a flange body 132 annularly disposed about the longitudinal axis 20 and having an inner radial side 134 and an outer radial side 136. A plurality of fastener holes 138 are formed through the flange body 132 (e.g., in an axial direction with respect to the longitudinal axis 20). A circumferential centerline 140 bisects each fastener hole 138. The circumferential centerline 140 defines an outer radial portion 150 (i.e., a portion of the flange 122 adjacent a case 200) and an inner radial portion 148 of the flange body 132. Each fastener hole 138 includes a radial centerline 142 bisecting the respective fastener hole in a radial direction. Each fastener hole 138 further includes an inner diameter 144 (i.e., the radially innermost portion of the fastener hole 138) and an outer diameter 146 (i.e., the radially outermost portion of the fastener hole 138). In the illustrated embodiment, the flange 122 may be associated with, affixed to, or otherwise coupled to a case 200. In certain embodiments, the flange 122 may be integrally formed with the case 200.

Referring to FIGS. 3, 4, and 6A-C, during operation, heat generating components, such as components in the combustor section 16 or the turbine section 18, etc., can transfer heat into the flange body 32, 132. Due to the proximity of the inner radial portion 48, 148 of the flange body 32, 132 to heat generating components, the inner radial portion 48, 148 may heat up more than the outer radial portion 50, 150 of the flange body 32, 132, creating a thermal gradient across the flange body 32, 132. In the illustrated embodiment, the thermal gradient extends in a generally radially outward direction (e.g., from the inner radial side 34, 134 to the outer radial side 36, 136), with hotter temperatures near the inner radial portion 48, 148 and cooler temperatures near the outer radial portion 50, 150. In certain embodiments, the thermal gradient can be affected by the ambient airflow near the outer radial portion 50, 150 of the flange body 32, 132.

Due to thermal gradient experienced across the flange body 32, 132, various portions of the flange body 32, 132 can experience different temperatures at a given time. Various portions of the flange body 32, 132 can expand at different rates in response to the difference in temperatures across the thermal gradient. As one of ordinary skill in the art will appreciate, if portions of the flange body 32, 132 are constrained during thermal expansion and contraction, the flange body 32, 132 can experience stress, including but not limited to, increased hoop (i.e., circumferential) stress. Stress across the flange body 32, 132 may also be applied by other forces, for example, stress caused by external loads or pressure differentials across the flange body 32, 132.

The flange 22, 122 includes one or more shielding zones 52, 152 wherein shielding geometry has a significant impact on stress of the flange 22, 122 as a result of a thermal gradient, pressure differential across the flange 22, 122, external load on the flange 22, 122, etc. An exemplary shielding zone 52, 152 is illustrated in FIGS. 4 and 6C (depicted with heavier dashed lines). The actual location of the shielding zone 52, 152 on the flange body 32, 132 may vary. In general, at least a portion of the shielding zone 52, 152 may be located between adjacent fastener holes 38, 138. For example, FIG. 4 illustrates an exemplary shielding zone 52 located in the inner radial portion 48 of the flange body 32 and having a portion of the shielding zone 52 located between the adjacent fastener holes 38. FIG. 6C illustrates an exemplary shielding zone 152 located in the outer radial portion 150 of the flange body 132 and having a portion of the shielding zone 152 located between the adjacent fastener holes 138. In other embodiments, the shielding zone 52, 152 may be bounded by, for example, the inner radial side 34 (outer radial side 136), the radial centerlines 42, 142 of adjacent fastener holes 38, 138, and the adjacent fastener holes 38, 138. However, the location of the shielding zone 52, 152 is not limited by the above examples and may include other portions of the flange body 32, 132.

Referring to FIGS. 3, 5A-D, and 6A-C, the shielding zone 52, 152 may include a shielding feature 54, 154 configured to reduce stress at portions of the flange body 32, 132 (e.g., proximate the inner diameter 44 (outer diameter 146) of the fastener holes 38, 138), for example, a stress induced by a thermal gradient. The shielding feature 54, 154 alters the shielding geometry (i.e., the stress concentration distribution) of the shielding zone 52, 152 by removing flange body 32, 132 material (e.g., a thru-hole or recess) within the shielding zone 52, 152 while leaving the inner radial side 34 (outer radial side 136) intact (i.e., the "snap face" or radial fitting between the flange 22, 122 and the case 100, 200). Accordingly, stress at other portions of the flange body 32, 132 is reduced without impacting flange 22, 122 leakage (e.g., leakage of gas turbine engine 10 gases past the flange 22, 122).

Figure 5A:
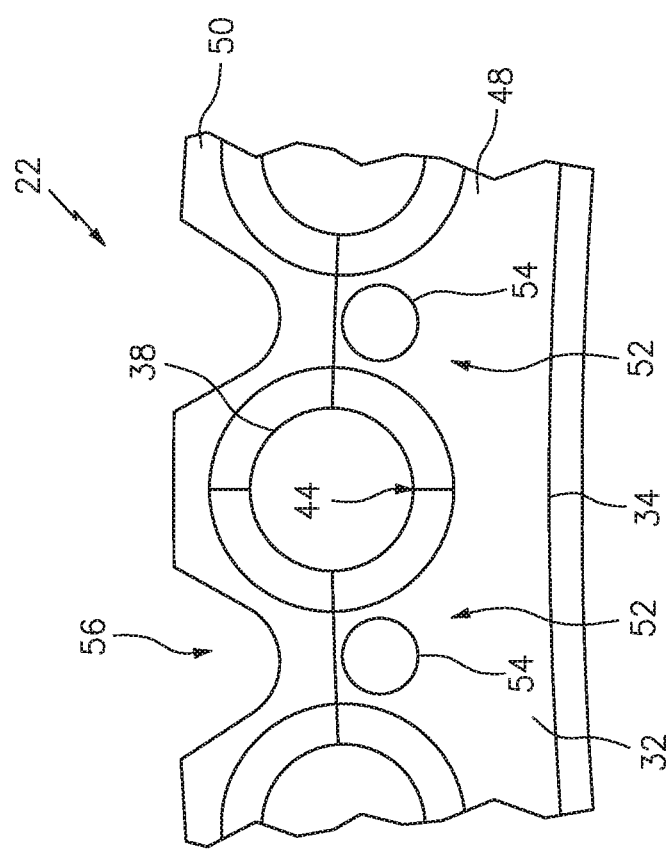
FIG. 5A is a front view of a portion of the outer flange of FIG. 4 with an exemplary shielding feature.
Figure 5B:
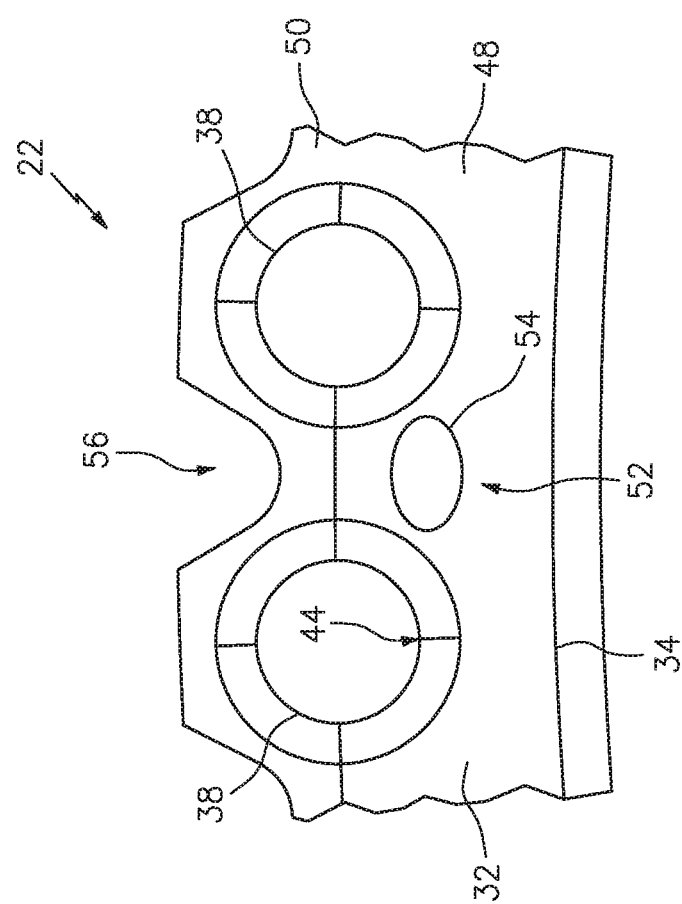
FIG. 5B is a front view of a portion of the outer flange of FIG. 4 with an exemplary shielding feature.
Figure 5C:
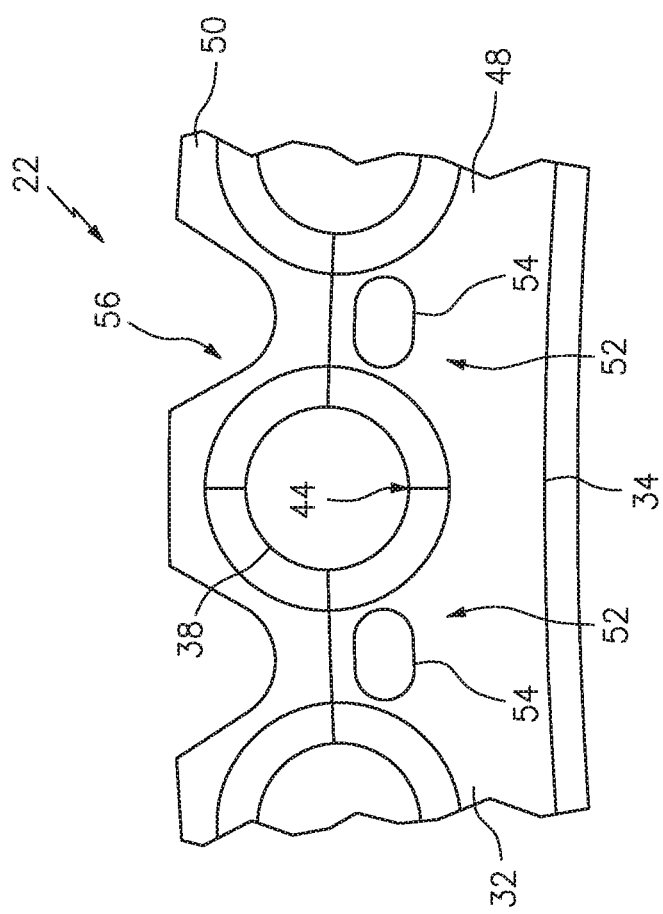
FIG. 5C is a front view of a portion of the outer flange of FIG. 4 with an exemplary shielding feature.

Referring to FIGS. 5A-C, the shielding feature 54 may be configured as a thru-hole extending through flange body 32 within the shielding zone 52 in a substantially axial direction (i.e., extending from an axial side of the flange body 32 to an opposing axial side of the flange body 32 within the shielding zone 52). Various shapes and sizes of the shielding feature 54 may be appropriate for reducing stress of portions of the flange body 32. The shielding feature 54 may have a generally cylindrical form extending through the flange body 32. For example, the shielding feature 54 may have a generally circular, ovoid, elliptical, obround, or any other suitable shape. Additionally, the diameter of the shielding feature 54 may or may not be consistent along the axial length of the shielding feature 54.

Figure 5D:
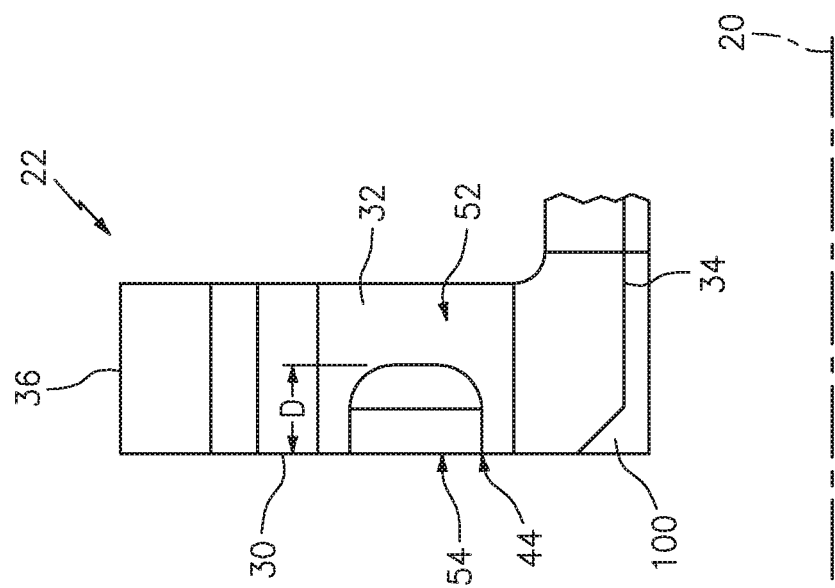
FIG. 5D is a side view of a portion of the outer flange of FIG. 4 with an exemplary shielding feature.

Referring to FIG. 5D, the shielding feature 54 may be configured as a partial-depth D recess disposed on the flange face 30 and extending through a portion of the flange body 32 within the shielding zone 52 in a substantially axial direction (i.e., extending from an axial side of the flange body 32 within the shielding zone 52). Similar to the shielding feature 54 having a thru-hole configuration, discussed above, various shapes and sizes of the shielding feature 54 with a recess configuration may be appropriate for reducing stress of portions of the flange body 32. Selection of appropriate shielding features 54 may depend on flange 22 design requirements. For example, a shielding feature 54 having a recess configuration may provide reduced stress mitigation as compared to a thru-hole configuration but may provide greater resistance to flange 22 leakage. Shielding feature 154 may be configured similarly to that discussed above with respect to shielding feature 54.

In some embodiments, the shielding zone 52, 152 may have more than one shielding feature 54, 154 (e.g., 2, 3, 4, or more shielding features 54, 154). The more than one shielding feature 54, 154 may be identical in size and/or shape to one another or may have different sizes and/or shapes (e.g., generally circular, ovoid, elliptical, obround, or any other suitable shape). For example, the shielding zone 52, 152 may include a shielding feature 54, 154 configured as a thru-hole and another shielding feature 54, 154 configured as a recess. In some embodiments, the shielding feature 54, 154 in the shielding zone 52, 152 may be different than the shielding feature 54, 154 in another shielding zone 52, 152 (see, e.g., FIG. 3).

Alternatively, in some embodiments, a first shielding zone 52, 152 may include a shielding feature 54, 154 while a second shielding zone 52, 152 does not include a shielding feature 54, 154. For example, the flange 22, 122 may include a shielding feature 54, 154 within the shielding zone 52, 152 between each other pair of adjacent fastener holes of the plurality of fastener holes 38, 138. The disclosure herein should not be understood as being limited to having one or more shielding features 54, 154 between each pair of adjacent fastener holes of the plurality of fastener holes 38, 138).

Referring to FIGS. 3-6C, in some embodiments the flange 22, 122 may include scallop features 56, 156, independent of the shielding feature 54, 154, disposed on the outer radial portion 50 (inner radial portion 148) of the flange body 32, 132. For example, the scallop feature 56, 156 may be located radially outward or inward of the shielding zone 52, 152 between adjacent fastener holes 38, 138. The scallop features 56, 156 may further reduce thermal stress experienced by the flange body 32, 132 by removing material from high hoop-stress areas. Further, removal of material to form the scallop features 56, 156 may effect weight reduction of the flange 22, 122.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A gas turbine engine comprising:
   a first case;
   a first flange comprising:
      a flange body annularly disposed about a longitudinal centerline of the gas turbine engine and comprising a first radial side and a second radial side, the flange body extending radially from the first radial side to the second radial side, and the flange body defining a first fastener hole and a circumferentially adjacent second fastener hole formed through the flange body, wherein the flange body is connected to the first case at the first radial side and the first flange projects radially out from the first case in a first radial direction, a circumferential centerline extends circumferentially about the longitudinal centerline, the circumferential centerline bisects the first fastener hole dividing the first fastener hole into two equal first fastener hole parts, the circumferential centerline bisects the second fastener hole dividing the second fastener hole into two equal second fastener hole parts;
      a first shielding zone, at least a portion of the first shielding zone located between the first and second fastener holes; and
      a first shielding feature disposed in the first shielding zone, the first shielding feature located radially between and displaced radially away from the circumferential centerline and the first radial side, the first shielding feature comprising an aperture with a circular cross-sectional geometry, and a center point of the aperture radially displaced from the circumferential centerline;
   a second case; and
   a second flange connected to the second case, the second flange projecting radially out from the second case in the first radial direction, and the second flange mechanically attached to the first flange.

2. The gas turbine engine of claim 1, wherein
the flange body comprises a first radial portion and a second radial portion radially adjacent the first radial portion;
the circumferential centerline forms a boundary line between the first radial portion and the second radial portion; and
the first shielding zone is disposed within the first radial portion.

3. The gas turbine engine of claim 1, wherein the first flange is within at least one of a combustor section or a turbine section of the gas turbine engine.

4. The gas turbine engine of claim 1, wherein the aperture extends axially through the flange body.

5. The gas turbine engine of claim 1, further comprising
a first bolt projecting through the first fastener hole and mechanically attaching the first flange with the second flange; and
a second bolt projecting through the second fastener hole and mechanically attaching the first flange with the second flange.

6. A gas turbine engine apparatus, comprising:
   a first case;
   a first flange integrally formed with the first case, the first flange projecting radially out from the first case in a first radial direction, and the first flange comprising:
      a flange body annularly disposed about a longitudinal centerline of the gas turbine engine apparatus, the flange body comprising a first radial side and a second radial side, the flange body extending radially between the first radial side and the second radial side, and the flange body forming a first fastener hole and a second fastener hole formed through the flange body, the second fastener hole circumferentially adjacent the first fastener hole, wherein a circumferential centerline extends circumferentially about the longitudinal centerline and bisects the first fastener hole and the second fastener hole;
      a first shielding zone, at least a portion of the first shielding zone located between the first fastener hole and the second fastener hole; and
      a first shielding feature disposed in the first shielding zone, the first shielding feature comprising an aperture with a circular cross-sectional geometry, and a center point of the aperture radially displaced from the circumferential centerline;
   a second case; and
   a second flange integrally formed with the second case, the second flange projecting radially out from the second case in the first radial direction, and the second flange mechanically attached to the first flange.

7. The gas turbine engine apparatus of claim 6, further comprising
a first bolt projecting through the first fastener hole and mechanically attaching the first flange and the second flange together; and
a second bolt projecting through the second fastener hole and mechanically attaching the first flange and the second flange together.

8. The gas turbine engine apparatus of claim 6, wherein the first case is an outer diffuser case.

9. The gas turbine engine apparatus of claim 6, wherein the first case is a high-pressure turbine case.

* * * * *